United States Patent
Chiang et al.

(10) Patent No.: US 10,843,955 B2
(45) Date of Patent: Nov. 24, 2020

(54) NON-CONTACT SHAPING DEVICE AND METHOD

(71) Applicant: HI-NANO OPTOELECTRONICS CO., LTD., Yilan (TW)

(72) Inventors: Chao-Tsung Chiang, Yilan (TW); Lu-Kun Kang, Yilan (TW)

(73) Assignee: Hi-Nano Optoelectronics Co., Ltd., Yilan (TW)

( * ) Notice: Subject to any disclaimer, the term of this patent is extended or adjusted under 35 U.S.C. 154(b) by 219 days.

(21) Appl. No.: 16/149,473

(22) Filed: Oct. 2, 2018

(65) Prior Publication Data

US 2019/0389760 A1  Dec. 26, 2019

(30) Foreign Application Priority Data

Jun. 25, 2018  (TW) .............................. 107121757 A

(51) Int. Cl.
*C03B 23/00* (2006.01)
*C03B 23/035* (2006.01)

(52) U.S. Cl.
CPC ...... *C03B 23/0352* (2013.01); *C03B 23/0086* (2013.01)

(58) Field of Classification Search
CPC ............ C03B 23/0086; C03B 23/0235; C03B 23/0258; C03B 23/0307; C03B 23/0352; C03B 2215/63
See application file for complete search history.

(56) References Cited

U.S. PATENT DOCUMENTS

| 5,004,491 | A | * | 4/1991 | McMaster | ............... C03B 23/03 65/104 |
| 5,078,770 | A | * | 1/1992 | Lehto | .................. C03B 23/0252 65/106 |
| 5,079,931 | A | * | 1/1992 | Lehto | .................. C03B 23/0307 65/106 |
| 8,783,066 | B2 | | 7/2014 | Bailey et al. | |
| 2008/0134721 | A1 | * | 6/2008 | Maeda | ................ C03B 23/0258 65/29.1 |

FOREIGN PATENT DOCUMENTS

| JP | 5934801 B2 | 6/2016 |
| TW | I460139 B | 11/2014 |
| TW | I628149 B | 7/2018 |
| WO | 2013055861 A1 | 4/2013 |

\* cited by examiner

*Primary Examiner* — Cynthia Szewczyk
(74) *Attorney, Agent, or Firm* — Rosenberg, Klein & Lee

(57) ABSTRACT

A non-contact shaping device includes a first fixture including a fixing section structured to alternately blow out and suck in gas. The fixing section may fix, through suction of gas, a glass plate thereon. An optic heat source processing device is selectively set above predetermined portions of the glass plate to heat, in a non-contact manner, and thus soften, in a temperature-controlled manner, the portions for curving and suspending downward along an edge of the fixing section. The curved glass plate is then lifted up through blowing gas from the first fixture. The second fixture selectively covers the curved glass plate and blow gas therefrom to flow, in collaborative combination with the gas blown from the first fixture, around surfaces of the curved glass plate for cooling and fixing a shape of the curved glass plate in a non-contact manner to form a three-dimensional curve-surfaced glass product.

19 Claims, 11 Drawing Sheets

NON-CONTACT SHAPING DEVICE AND METHOD

BACKGROUND OF THE INVENTION

1. Field of the Invention

The present invention relates to a non-contact shaping device and method, and more particularly to a device and a method for curving and shaping a planar glass plate by using at least a non-contact heat source, a first, sucking-and-blowing fixture, and a second, blowing fixture to process the planar glass plate for curving and shaping into a three-dimensional curved glass plate.

2. The Related Arts

Three-dimensional curved glass plates have been widely used in various products, including smart phones, tablet computers, electrical equipment panels, glass panels of display, and automobile dashboards to provide these products with curved displaying or touch controlling at peripheries. A conventional way of manufacturing a three-dimensional curved plate is to first shape a glass plate through heating, pressing, and curving with a mold, followed by cutting with a computer numeric control (CNC) machine tool, or alternatively, a glass plate is first cut with a CNC machine tool in a two-dimensional planar form, followed by shaping through heating, pressing, and curving with a mold. Both ways require use of a mold made of graphite as shown in FIG. 1, which includes an upper mold parts A and a lower mold parts B with which shaping a glass plate C is conducted through heating and pressing. In other words, processing is conducted in a "contact" manner with a processing tool and/or mold.

The known way of manufacturing a three-dimensional curved glass plate as discussed above often generates tiny cracking or irregularity in and along edges of the glass plate due to being processed in a manner of contacting with a processing tool or mold, such as contact processing including cutting or chamfering applied with a CNC machine tool. In addition to the extended time required for processing a glass plate and low productivity (processing of each piece of glass being around 2 to 5 minutes) and inconsistency of quality, the glass plate so processed must be subjected to additional finishing of the edges thereof with an additional polishing device. Further, even though the glass plate has already been subjected to the additional edge finishing operations with polishing devices, wear of the polishing devices may still lead to inconsistency or irregularity of the size and quality of the glass plates. Size deviation may thus result, causing significant influence on accuracy and quality of subsequent processing.

In addition, the contact processing for shaping a three-dimensional glass plate through heating and curving with the upper mold parts A and lower mold parts B shown in FIG. 1 is carried out by heating pressing the entirety of the glass plate C at a high temperature with the upper mold parts A and lower mold parts B that are made of graphite. The planar glass plate C that is cut and polished in the contact manner as discussed above often suffer size deviation or dimensional inaccuracy and as such, the glass plate C that suffers the size deviation or dimensional inaccuracy would also suffer size deviation after being processed through heating and curving. Thus, it would be a challenge to properly set up a necessary gap between the mold parts A, mold parts B. For example, an over-reduced gap between the mold parts A, mold parts B would leave no room for accommodating expansion of the glass plate after being heated and eventually leading to cracking or breaking. On the other hand, an over-enlarged gap would cause positional shifting of the glass plate, leading to positional deviation in subsequent operations of drilling or punching conducted on the glass plate. In addition, carbon particles or other impurities resulting from oxidation of the graphite material of the mold parts A, mold parts B may attach to the surface of the glass plate. The carbon particles detached from the graphite mold parts A, mold parts B would cause pits and cavities formed on the surface of the glass plate so that additional cleaning and polishing would be necessary for surface finishing. This would lower down the yield of shaping curved glass plates (which is at most about 50% only). The manufacturing cost of shaping and curving the glass plates is also very high.

In addition to the issues of low yield and high cost for necessary subsequent surface polishing and finishing for the known way of shaping a glass plate C through heating and curving with an upper mold parts A and a lower mold parts B, another issue of concern is the service life of the graphite-made upper and lower mold parts A, mold parts B. The upper and lower mold parts A, mold parts B generally have a life span for processing around 1,000-3,000 glass plates and once reaching such a limit of processing capacity, new mold parts must be provided to replace the old ones. This inevitably increases the manufacturing cost of curving and processing the glass plates and the overall processing time of the glass plates is also extended. It is known that the time period necessary for processing each glass plate in the way described above is around 50-60 seconds on average. In other words, averagely, around 60 glass plates can be processed in a period of one hour working time, and this indicates the production performance is generally low. In addition, since the glass plate C is completely covered by the graphite-made upper and lower mold parts A, mold parts B, it is generally impossible to measure and identify temperature distribution in the glass plate after the glass plate has been heated. The only way that one can learn about the temperature distribution of the glass plate is to infer from the temperature of individual points of the outside surfaces of the mold parts A, mold parts B. Thus, it is generally not possible to monitor and control the temperature of each portion of the glass plate as being heated. Over-heating or under-heating may thus readily result for one or more individual portions of the glass plate, leading to locally high or low temperature spots. Burning spots and cracking may thus occur on the surface of the glass plate so processed and excessive internal stress may also occur, leading to lowering of the mechanical strength of the glass plate, as well as brittleness and easy breaking.

Patent documents regarding this issue are known. For example, Taiwan Patent No. 1460139 discloses "a fabrication method and a fabrication system for glass products and an electronic device", in which a combination of upper and lower mold parts as previously known is provided to carry out processing of curving a glass plate through heating. This patent suffers the same drawbacks and deficiencies as those discussed above with reference to the prior art shown in FIG. 1, such as poor yield, subsequent and additional operations of polishing, trimming, and finishing surfaces of glass plates, erroneous sizes of glass plates, frequent replacement of molds due to shortened service lives thereof, process and machinery being extended and complicated, shipping time of glass plate product being extended and overall fabrication cost being high, making them uneconomic.

Other examples include U.S. Pat. No. 8,783,066, which discloses "glass molding system and related apparatus and method", and Japanese Patent JP5934801, which discloses a molding device. In these patents, large-scale and tedious contact type glass plate processing methods involving graphite-made mold parts are provided, similar to what is discussed with reference to the prior art of FIG. 1. Again, these patents suffer the same drawbacks and deficiencies as those discussed above with reference to the prior art shown in FIG. 1, such as poor yield, subsequent and additional operations of polishing, trimming, and finishing surfaces of glass plates, erroneous sizes of glass plates, frequent replacement of molds due to shortened service lives thereof, process and machinery being extended and complicated, shipping time of glass plate product being extended and overall fabrication cost being high, making them uneconomic.

In addition, WO2013055861 A1 discloses "thermo-mechanical reforming method and system and mechanical reforming tool", which discloses a system and a method that curves or bends a glass plate by using a push rod to contact a heated and curved section of the glass plate. However, for such a technique of using a push rod to directly contact the heated and curved section of a glass plate, additional subsequent processing, including polishing and finishing, is necessary, leading to an increase of the processing cost. In addition, the push rod may apply an excessively large force to the heated and curved section of the glass plate and this would cause breaking of the glass plate; or, on the other hand, the push rod may apply an excessively small force to the heated and curved section of the glass plate and this would lead to inconsistency of curving of the glass plate, and consequently, leading to impreciseness of control of the quality of glass plate product.

Further, the applicant's Taiwan Patent No. 1628149, which discloses a system and a method for non-contact processing of 3D curved surface of glass plate, provides a technique related to a non-contact processing system for heating and curving a glass plate and a method associated therewith.

SUMMARY OF THE INVENTION

The known processes and techniques for curving a glass plates that are conducted in a contact manner suffer various disadvantages, such as poor yield, subsequent and additional operations of polishing, trimming, and finishing surfaces of glass plates, erroneous sizes of glass plates, frequent replacement of molds due to shortened service lives thereof, process and machinery being extended and complicated, shipping time of glass plate product being extended and overall fabrication cost being high, making them uneconomic.

Thus, the present invention provides a non-contact shaping device, which comprises:

at least one first fixture operable to supply a blowing-out gas and a sucking-in gas and having a top on which a fixing section is formed, the fixing section on the top of the first fixture being structure to allow the blowing-out gas and the sucking-in gas to be supplied therethrough to carry out an operation of suction-fixing or an operation of lifting upward for at least one planar glass plate;

at least one movable and temperature-controllable optic heat source processing device, wherein the optic heat source processing device is movable to a location above the first fixture to carry out heating, in a non-contact and temperature controlled manner, on predetermined heating portions on four peripheral edges of front, rear, left, and right sides of the planar glass plate positioned on the fixing section of the first fixture so that the predetermined heating portions of the four peripheral edges of front, rear, left, and right sides of the planar glass plate are softened and thus curved and suspending downward along a periphery of the fixing section and the curved glass plate is then caused to lift upward by gas blown from the fixing section of the first fixture; and at least one movable and downward-gas-blowing second fixture, wherein the second fixture is movable to cover and house a top side of the curved glass plate that is caused to lift upward by gas blowing from the first fixture and wherein the second fixture supplies a blowing-out gas downward from an underside thereof to collaboratively surround, in combination with the blowing-out gas blown upward from the first fixture, a top surface and an undersurface of the curved glass plate to cause, in a non-contact manner, cooling and shape fixing of the curved glass plate to form a three-dimensional curve-surfaced glass product.

Further, in the above non-contact shaping device of the present invention, the first fixture is formed therein with at least one gas blowing and sucking channel, and the fixing section of the first fixture is formed with at least one egress gas hole, the egress gas hole being connected to and in communication with an end of the gas blowing and sucking channel.

In the above non-contact shaping device of the present invention, an end of the gas blowing and sucking channel of the first fixture is connected to at least one first gas source.

In the above non-contact shaping device of the present invention, the first gas source connected to an end of the gas blowing and sucking channel of the first fixture is operable to supply a sucking-in gas or a blowing-out gas of which a temperature is controllable.

In the above non-contact shaping device of the present invention, the first fixture is made of a temperature-resistant metallic material.

In the above non-contact shaping device of the present invention, the first fixture is made of a temperature-resistant non-metallic material.

In the above non-contact shaping device of the present invention, a shaping curve surface is formed in each of four peripheral edges of front, rear, left, and right sides of the fixing section of the first fixture.

In the above non-contact shaping device of the present invention, the fixing section of the first fixture and an undersurface of the heated and upward-lifted curved glass plate form therebetween a first gas gap, so that the blowing-out gas of the fixing section is allowed to move through the first gas gap to flow around the undersurface of the curved glass plate.

In the above non-contact shaping device of the present invention, the first gas gap formed between the fixing section of the first fixture and the inner surface of the heated and upward-lifted curved glass plate has a height of 5-50 µm.

In the above non-contact shaping device of the present invention, the planar glass plate that is positioned on the fixing section of the first fixture is picked up and moved to the location on the fixing section by at least one movable pick-up device.

In the above non-contact shaping device of the present invention, the planar glass plate positioned on the fixing section of the first fixture is subjected to homogeneous pre-heating on a surface thereof to a temperature that is lower than a glass transition temperature of a glass material of the planar glass plate by around 30-80° C.

In the above non-contact shaping device of the present invention, the optic heat source processing device comprises an infrared heater.

In the above non-contact shaping device of the present invention, the optic heat source processing device comprises a laser heater.

In the above non-contact shaping device of the present invention, the second fixture is formed, in an undersurface thereof, with at least one egress gas hole, and the second fixture is formed, in an interior thereof, with at least one gas blowing channel, the egress gas hole being connected to and in communication with an end of the gas blowing channel.

In the above non-contact shaping device of the present invention, the gas blowing channel of the second fixture has an end connected to at least one second gas source.

In the above non-contact shaping device of the present invention, the second gas source connected to an end of the gas blowing channel of the second fixture is operable to supply a temperature controllable blowing-out gas.

In the above non-contact shaping device of the present invention, the second fixture has an undersurface that is formed with a shaping recess, such that when the second fixture is moved to cover and house the top side of the curved glass plate that is caused to lift upward by gas blowing from the first fixture, the shaping recess and a top surface of the heated curved glass plate form a second gas gap therebetween to allow a gas blown downward from the undersurface of the second fixture to move through the second gas gap to flow around a top surface of the curved glass plate.

In the above non-contact shaping device of the present invention, the second gas gap formed between the shaping recess of the second fixture and the top surface of the heated curved glass plate has a height of 5-50 micrometers.

In the above non-contact shaping device of the present invention, the second fixture is made of a temperature-resistant metallic material.

In the above non-contact shaping device of the present invention, the second fixture is made of a temperature-resistant non-metallic material.

In the above non-contact shaping device of the present invention, the blowing-out gas supplied from the fixing section of the first fixture has a temperature that is higher than a temperature of the blowing-out gas supplied from the undersurface of the second fixture.

A non-contact shaping method comprises the following steps:

(a) picking up and moving a planar glass plate to a first fixture for positioning and fixing thereon, wherein the planar glass plate is picked up and moved by a movable pick-up device to a first fixture that is provided, on a top surface thereof, with at least one fixing section that is operable to supply a blowing-out gas or a sucking-in gas to be positioned on the fixing section on the top surface of the first fixture and the fixing section of the first fixture outputs the sucking-in gas to have the planar glass plate attached, through suction, to the fixing section;

(b) subjecting predetermined heating portions on four peripheral edges of the planar glass plate to heating, wherein at least one movable and temperature-controllable optic heat source processing device is moved to a location above the fixing section of the first fixture of Step (a) to carry out light-based heating, in non-contact manner, on the predetermined heating portions on the four peripheral edges of front, rear, left, and right sides of the planar glass plate that is positioned on the fixing section of the first fixture, wherein the planar glass plate is first heated to a temperature that is lower than a glass softening point temperature by around 30-80° C., and then the predetermined heating portions that are to be curved are heated to the glass softening point temperature of around 500-800° C. to have the four peripheral edge portions of the planar glass plate softened and thus curving and suspending downward along a periphery of the fixing section;

(c) lifting up the curved glass plate, wherein the fixing section of the first fixture of Step (a) supplies the blowing-out gas to cause the curved glass plate that is fixed on the fixing section of the first fixture and heated by the optic heat source processing device to lift up to separate from the fixing section, so that the heated curved glass plate and the fixing section of the first fixture form therebetween a first gas gap to allow the blowing-out gas supplied from the fixing section of the first fixture to move through the first gas gap to flow around an undersurface of the heated curved glass plate;

(d) moving a second fixture to cover and house and blow gas downward, wherein at least one movable and downward-gas-blowing second fixture is moved to cover and house a top side of the curved glass plate that is caused to lift up by the blowing-out gas that is supplied upward from the fixing section of the first fixture in Step (c) so that an undersurface of the second fixture and a top surface of the curved glass plate form therebetween a second gas gap, and a blowing-out gas blown downward from the undersurface of the second fixture moves through the second gas gap to flow around the top surface of the curved glass plate;

(e) cooling and fixing a shape of the curving of the glass plate in a non-contact manner, wherein the blowing-out gas that is blown upward from the fixing section of the first fixture in Step (c) and moves through the first gas gap formed between the heated curved glass plate of Step (c) and the fixing section of the first fixture to flow around the undersurface of the curved glass plate and the blowing-out gas that is blown downward from the second fixture of Step (d) and moves through the second gas gap formed between the undersurface of the second fixture and the top surface of the curved glass plate to flow around the top surface of the curved glass plate keep the curved glass plate between the first gas gap and the second gas gap to be collaboratively cooled and fixed of the shape thereof by means of the blowing-out gas blown upward from the first fixture and the blowing-out gas blown downward from the second fixture in a manner of not contacting the first fixture and the second fixture to form a three-dimensional curve-surfaced glass product and (f) removing the product, wherein the fixing section of the first fixture of Step (e) supplies, in an opposite direction, the sucking-in gas to cause, through suction, an undersurface of the three-dimensional curve-surfaced glass product that ahs been cooled down and shape fixed in a non-contact manner in Step (e), and then, the undersurface of the second fixture of Step (e) stops blowing downward the blowing-out gas, and the second fixture is moved to separate from a top surface of the cooled and shape-fixed three-dimensional curve-surfaced glass product of Step (e), and then, the fixing section of the first fixture stops supplying the sucking-in gas, and the pick-up device of Step (a) is moved to a location above the first fixture to pick up, from below, the three-dimensional curve-surfaced glass product positioned on the fixing section on the top of the first fixture.

Further, in the above non-contact shaping method according to the present invention, the first fixture of Step (a) is formed, in an interior thereof, with at least one gas blowing and sucking channel, the fixing section of the first fixture being formed with at least one egress gas hole, the egress gas hole being connected to and in communication with the gas blowing and sucking channel, the gas blowing and sucking channel having an end connected to at least one first gas source.

In the above non-contact shaping method according to the present invention, the planar glass plate of Step (a) is pre-heated to a temperature that is lower than the glass transition temperature of the planar glass plate by around 30-80° C.

In the above non-contact shaping method according to the present invention, the optic heat source processing device of Step (b) comprises an infrared heater.

In the above non-contact shaping method according to the present invention, the optic heat source processing device of Step (b) comprises a laser heater.

In the above non-contact shaping method according to the present invention, the second fixture of Step (d) has an undersurface that is formed with at least one egress gas hole, the second fixture being formed, in an interior thereof, with at least one gas blowing channel, the egress gas hole being connected to an end of the gas blowing channel, the gas blowing channel having an end connected to at least one second gas source.

In the above non-contact shaping method according to the present invention, the blowing-out gas that is blown up from the fixing section of the first fixture of Step (e) and the blowing-out gas blown downward from the second fixture have pressures that are identical.

The efficacy of the non-contact shaping device and method of the present invention is that the first fixture that can blow and suck gas and the second fixture that can blow gas are provided and the first fixture is arranged to first receive a planar glass plate to be positioned and fixed thereon. A non-contact optic heat source processing device is provided such that heating and temperature of an optic heat source are applied to carry out temperature distribution controllable heating to predetermined heating portions of four peripheral edges of front, rear, left, and right sides of the planar glass plate to have the four peripheral edge portions of the planar glass plate uniformly softened to curve and suspend downward along a periphery of the fixing section. Gas blown upward from the first fixture causes the heated and curved glass plate to lift up. The second fixture is then applied to cover, in a downward direction, a top side of the heated and curved glass plate, and gas blown downward from the second fixture and the gas blown upward from the first fixture act, respectively, on a top surface and an undersurface of the curved glass plate and are maintained at the same pressure. Particularly, the fixing section on the top of the first fixture and the undersurface of the curved glass plate form therebetween a first gas gap and a shaping recess formed in the undersurface of the second fixture and the top surface of the curved glass plate form a second gas gap, such that the top surface and the undersurface of the heated and curved glass plate are kept, in a balanced condition, between the first gas gap and the second gas gap, wherein a cooled and shape-fixed three-dimensional curve-surfaced glass product can be formed in a condition of being not in contact with mold and other facility, whereby the drawbacks of the prior art techniques caused by contact of a glass plate with a surface of a mold or a push rod, which causes surface burning marks and cracking found in a curved and shaped glass plate or excessive internal stress that causes reduction of mechanical strength of the glass plate that lead to brittleness and ease of breaking, or requires secondary polishing and finishing on a surface of the glass plate, or causing size error of the glass plate, or poor product yield, or reduced life span and frequent replacement of the mold, and poor yield of curving and shaping glass plate, and further, no need for shutting down of manufacturing line for replacement of mold, so that the throughput of the present invention can be as higher as time times of the conventional graphite mold based heating curving operations, to thereby greatly improve the industrial value and economic effectiveness of the present invention. In addition, the glass plate made with the present invention requires no processing tool or push rod that is required in the prior art to apply a force for pressing in the process of cutting, chamfering, locally heating and curving and shaped to form a three-dimensional curved glass, and subsequent drilling and polishing, so as to avoid abrasion and breaking of the surface of the glass plate occurring in a curving operation to further improve the reliability of processing and product yield of the three-dimensional curved glass according to the present invention.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
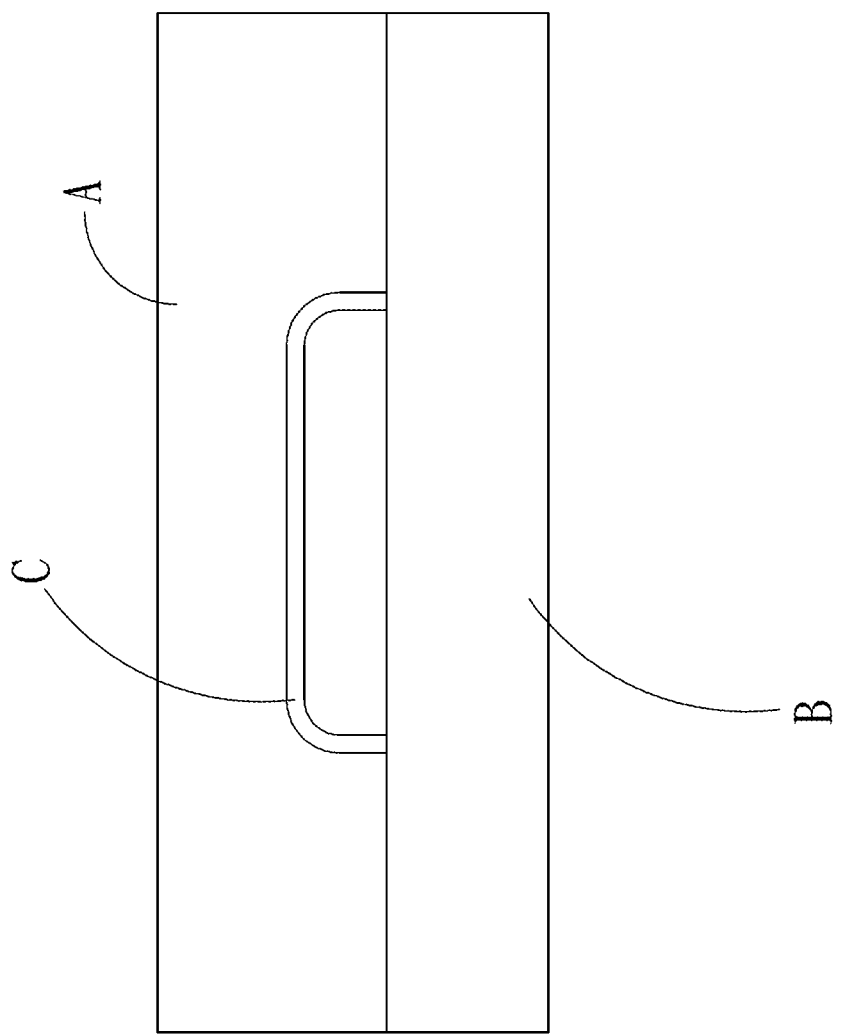
FIG. 1 is a schematic view showing a known way of heating, pressing, and curving a glass plate with a graphite mold.
Figure 2:
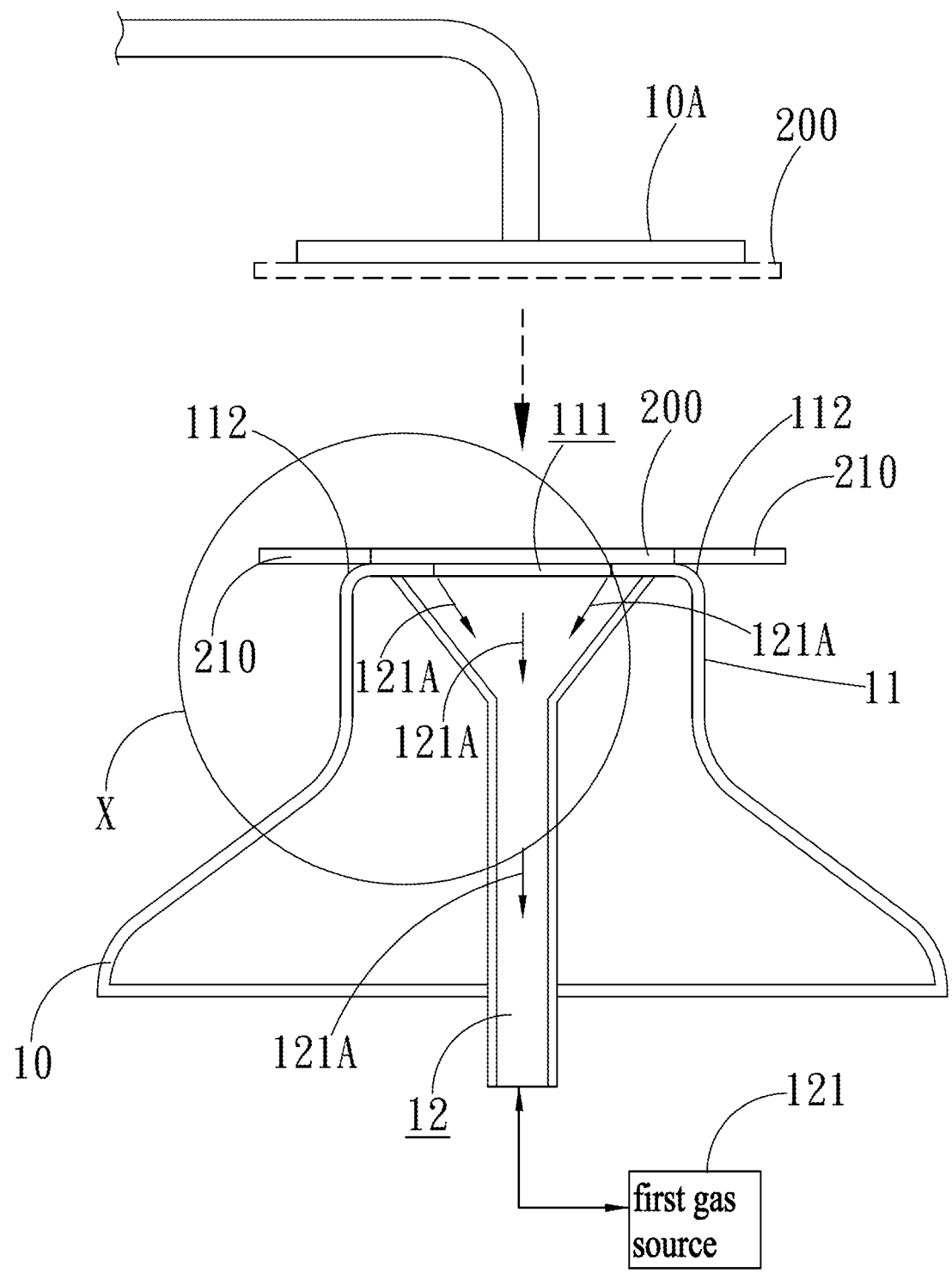
FIG. 2 is a schematic view illustrating a planar glass plate is attached, through suction, to a fixing section of a first fixture of a non-contact shaping device according to the present invention.
Figure 3:
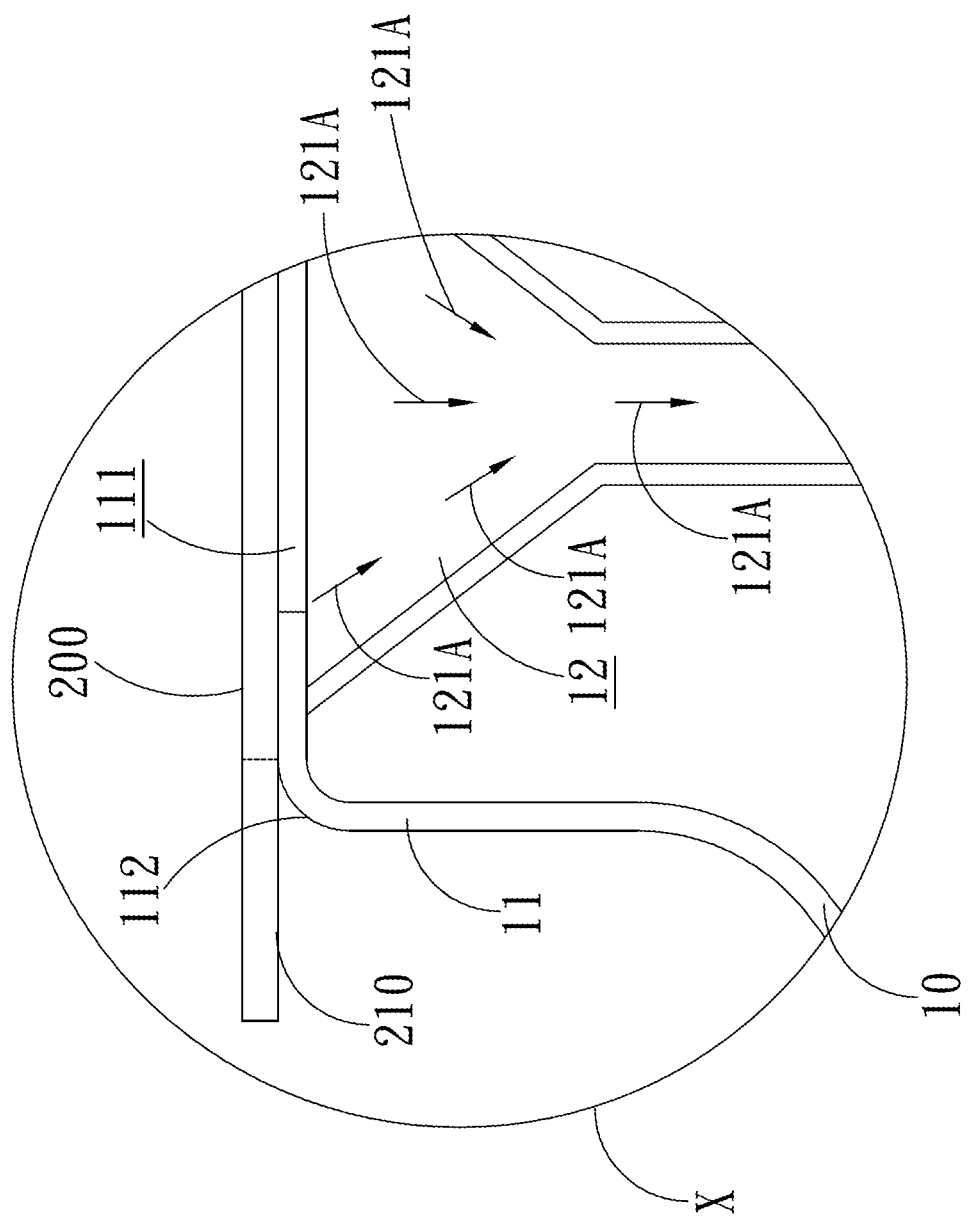
FIG. 3 is an enlarged view of a portion marked "X" in FIG. 2.

Referring to FIGS. 2 and 3, the present invention provides a non-contact shaping device 100, which comprises at least one first fixture 10. The first fixture 10 has a top that is provided with a fixing section 11. The fixing section 11 is formed with at least one egress gas hole 111. The fixing section 11 of the first fixture 10 is also formed, on a perimeter thereof, including four edges of front, rear, left, and right sides, with a shaping curve surface 112. The first fixture 10 is provided in an interior space thereof with at least one gas blowing and sucking channel 12. The gas blowing and sucking channel 12 has an end connected to the egress gas hole 111, and the gas blowing and sucking channel 12 has an opposite end connected to at least one first gas source 121. The first gas source 121 functions to supply a blowing-out gas or a sucking-in gas of which temperature is controllable. The arrangement of the first gas source 121 is not limited to being located outside the first fixture 10, and may alternatively arranged in the interior of the first fixture 10. In the illustrations of FIGS. 2 and 3, the first gas source 121 is set in a condition of outputting a sucking-in gas 121A (or, speaking in a different way, drawing in gas) so as to suck and fix a planar glass plate 200 on the fixing section 11 of the first fixture 10. The way that the planar glass plate 200 is positioned on the fixing section 11 of the top surface of the first fixture 10 is not limited and in this invention, an example of operating at least one movable pick-up device 10A to pick up and place it on the fixing section 11 is provided. The movable pick-up device 10A is not limited to any specific type and a movable suction cup is taken as an example in this invention.

The first fixture 10 is not limited to any specific material and can be made of a temperature-durable or temperature-resistant metallic material or a temperature-durable or temperature-resistant non-metallic material, such as diatomite or tungsten carbide, silicon carbide, silicon nitride, boron nitride, and ceramic materials.

Figure 4:
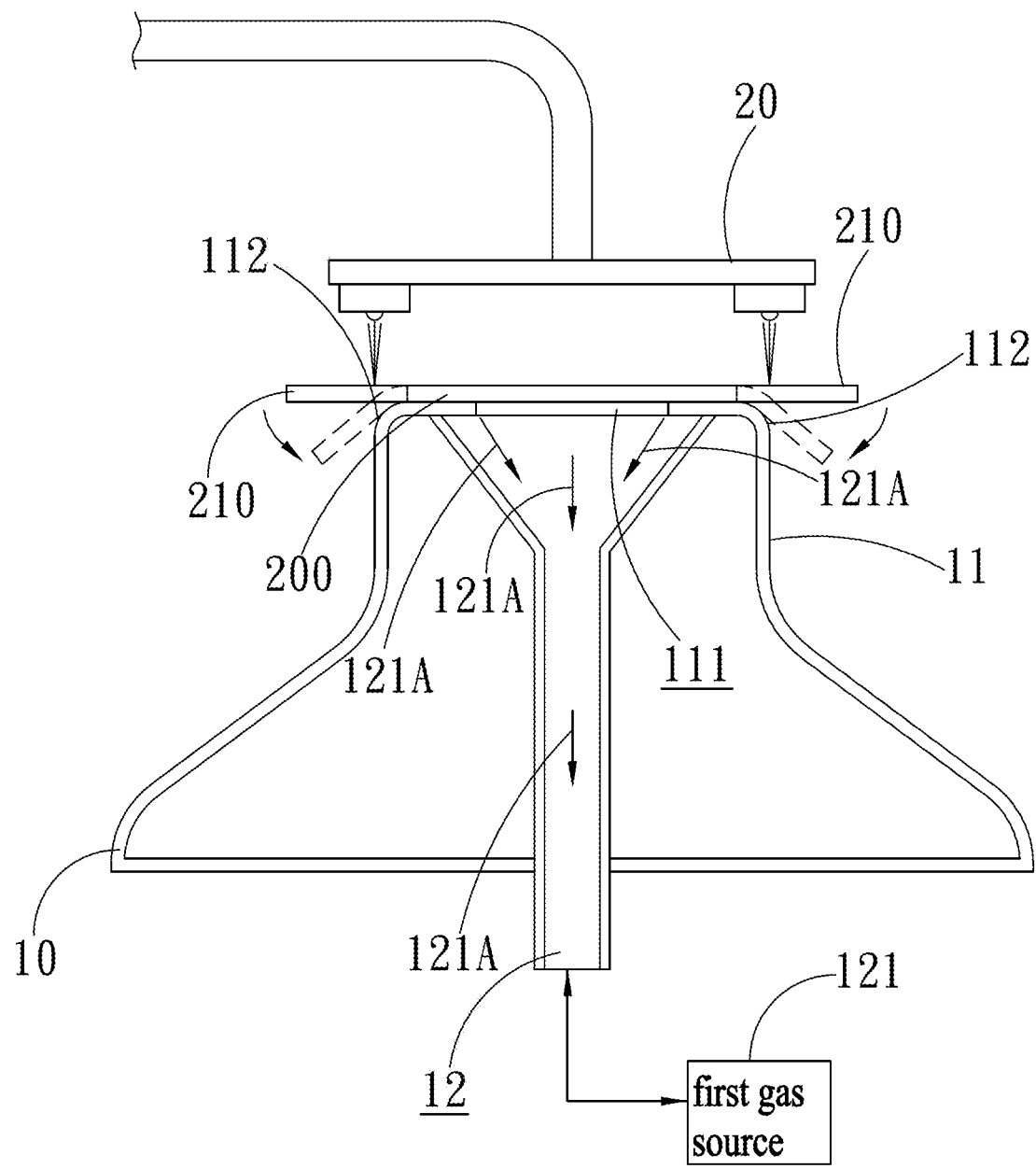
FIG. 4 is side elevational view illustrating a condition that an optic heat source processing device of the non-contact shaping device of the present invention is moved to a location for carrying out a local heating and curving operation on the planar glass plate positioned on the fixing section on the top of the fixture.
Figure 5:
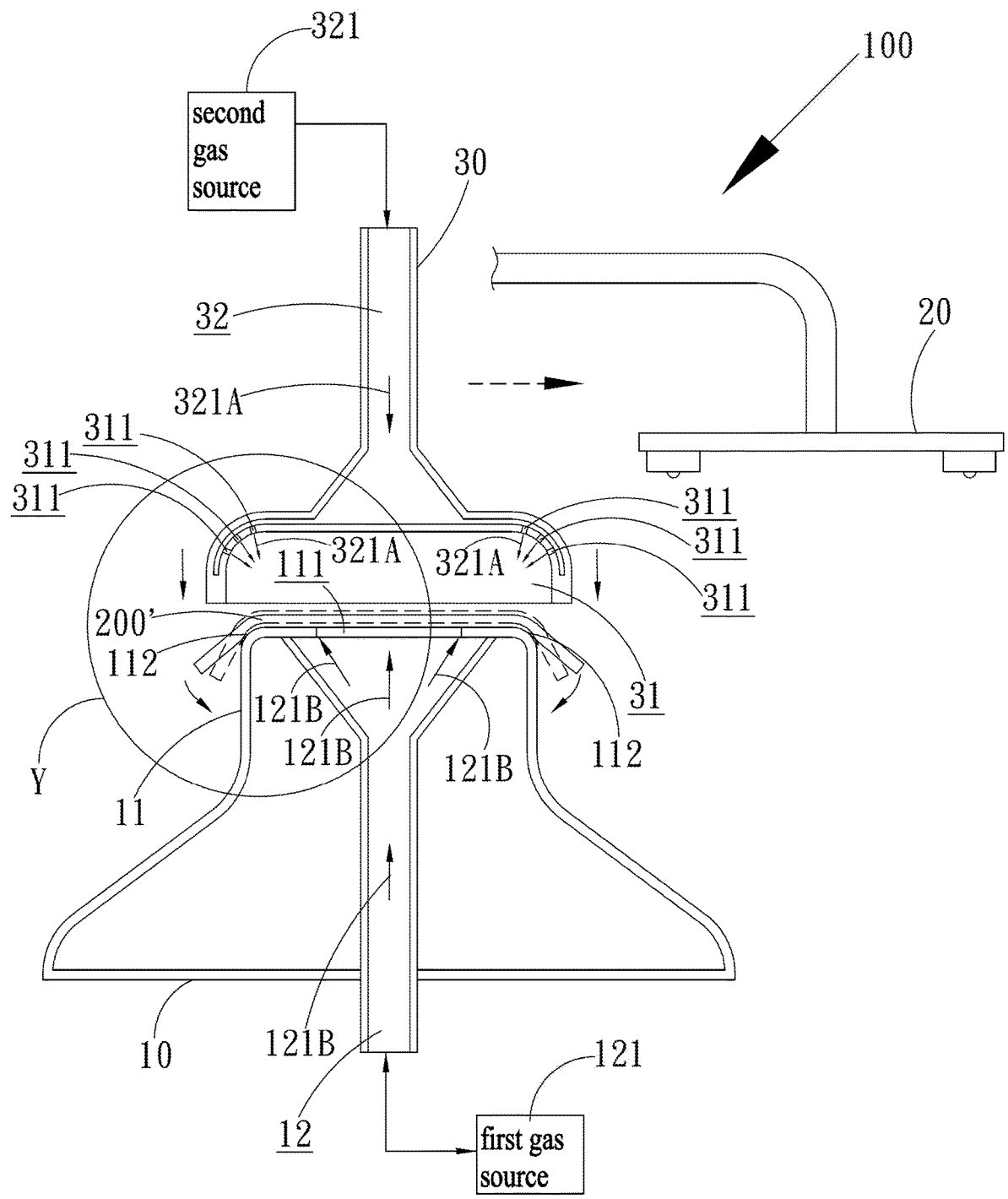
FIG. 5 is a side elevational view illustrating a condition that a second fixture of the non-contact shaping device of the present invention is moved to a location above the heated and curved glass plate.

Referring also to FIG. 4, at least one movable and temperature-controllable optic heat source processing device 20, which is not limited to any specific type, and can be made up of an infrared heater or a laser heater, so that the optic heat source processing device 20 is movable to a located above the first fixture 10 to conduct a temperature-controlled heating operation on predetermined heating portions 210 associated with four peripheral edges of front, rear, left, and right sides of the planar glass plate 200 positioned on the fixing section 11 of the first fixture 10 so that the predetermined heating portions 210 of the planar glass plate 200 on the four peripheral edges of the front, rear, left, and right sides thereof are softened and thus curve and suspend along peripheral edges of the fixing section (as shown in FIG. 5). The temperature to which the glass is heated is around the softening point of the glass, such as 500-800° C. (which can be varied according to the material that makes the planar glass plate 200). Before the optic heat source processing device 20 is operated to heat the predetermined heating portions 210 of the planar glass plate 200, pre-heating may be applied, in a generally uniform manner, to a surface of the planar glass plate 200 to reach a temperature that is lower than the glass transition temperature or glass softening point temperature of the planar glass plate 200 by around 30-80° C. in order to allow heating that is subsequently carried out with the optic heat source processing device 20 to heat and, thus cause curving of, the predetermined heating portions 210 of the planar glass plate 200 in a more uniform manner.

Figure 6:
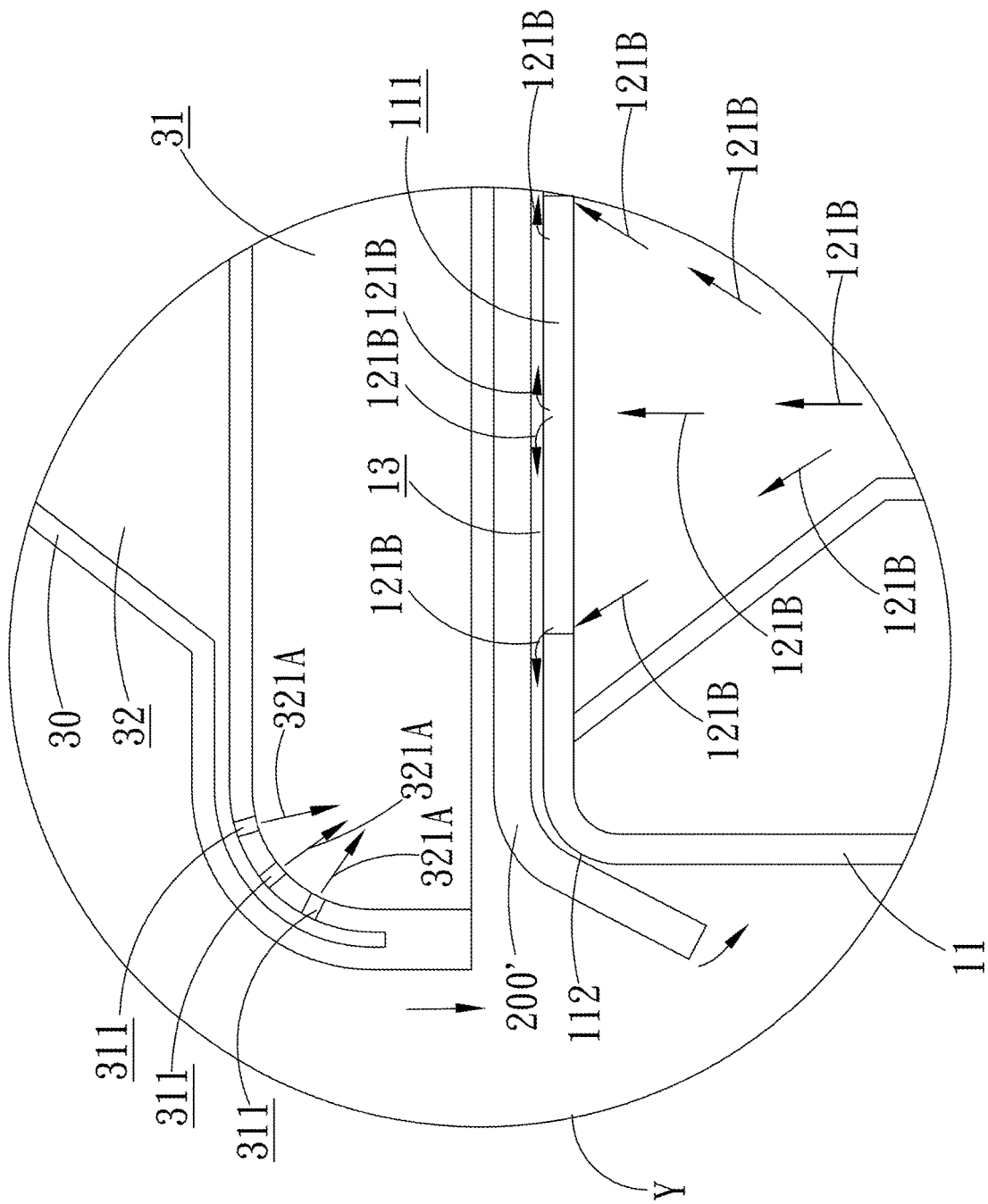
FIG. 6 is an enlarged view of a portion marked "Y" in FIG. 5.

Referring to FIGS. 5 and 6, at or after the time when the optic heat source processing device 20 is operated to carry out heating of the predetermined heating portions 210 of the planar glass plate 200 as illustrated in FIG. 4, the first gas source 121 of the first fixture 10 supplies, in an upward direction along the gas blowing and sucking channel 12, a blowing-out gas 121B toward the egress gas hole 111 of the fixing section 11 so that the blowing-out gas 121B forces the curved glass plate 200' to lift upward (as shown in FIGS. 5 and 6). At least one movable second fixture 30 is provided, wherein the second fixture 30 has an undersurface that is formed with a shaping recess 31, and the shaping recess 31 has a circumferential wall in which at least one egress gas hole 311 is formed. The second fixture 30 is provided, in an interior thereof, with at least one gas blowing channel 32, such that the egress gas hole 311 is in communication with one end of the gas blowing channel 32. An opposite end of the gas blowing channel 32 is connected to at least one second gas source 321. The second gas source 321 functions to supply a temperature-controlled blowing-out gas 321A. The second fixture 30 is operated such that during the optic heat source processing device 20 being operated to heat and thus cause curving of the predetermined heating portions 210 of the planar glass plate 200, the second fixture is moved downward to cover and house, from the above, the curved glass plate 200' that is blown upward and thus lifts upward from the first fixture 10, wherein the second gas source 321 of the second fixture 30 supplies, in a downward direction along the gas blowing channel 32, the blowing-out gas 321A to move through the egress gas hole 311.

The second fixture 30 is not limited to any specific material and can be made of a temperature-durable or temperature-resistant metallic material or a temperature-durable or temperature-resistant non-metallic material, such as diatomite or tungsten carbide, silicon carbide, silicon nitride, boron nitride, and ceramic materials.

Figure 7:
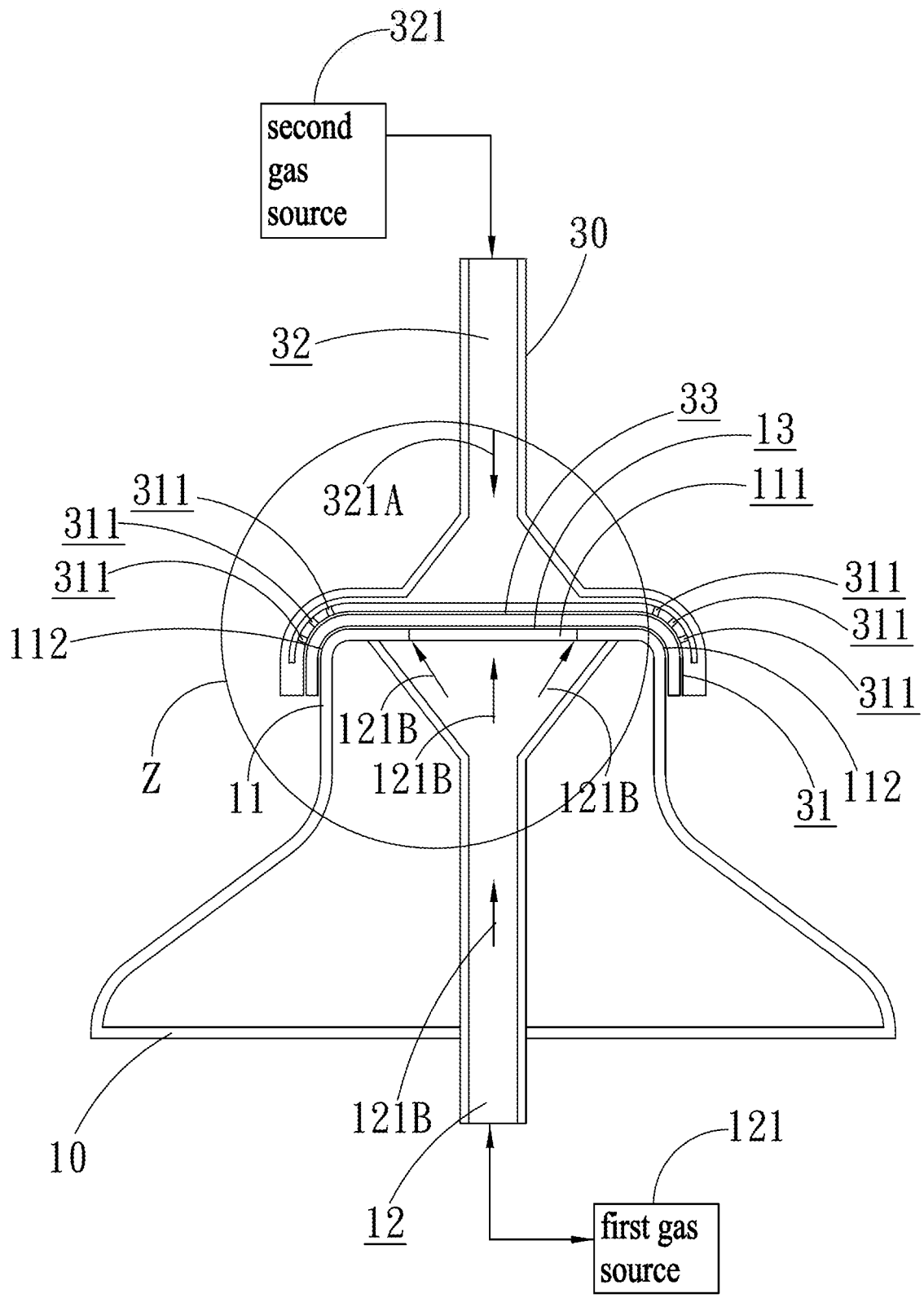
FIG. 7 is a side elevational view illustrating a condition that the second fixture of the non-contact shaping device of the present invention is set to completely cover and house a top side of the heated and curved glass plate in order to form a cooled and shape-fixed three-dimensional curve-surfaced glass product.
Figure 8:
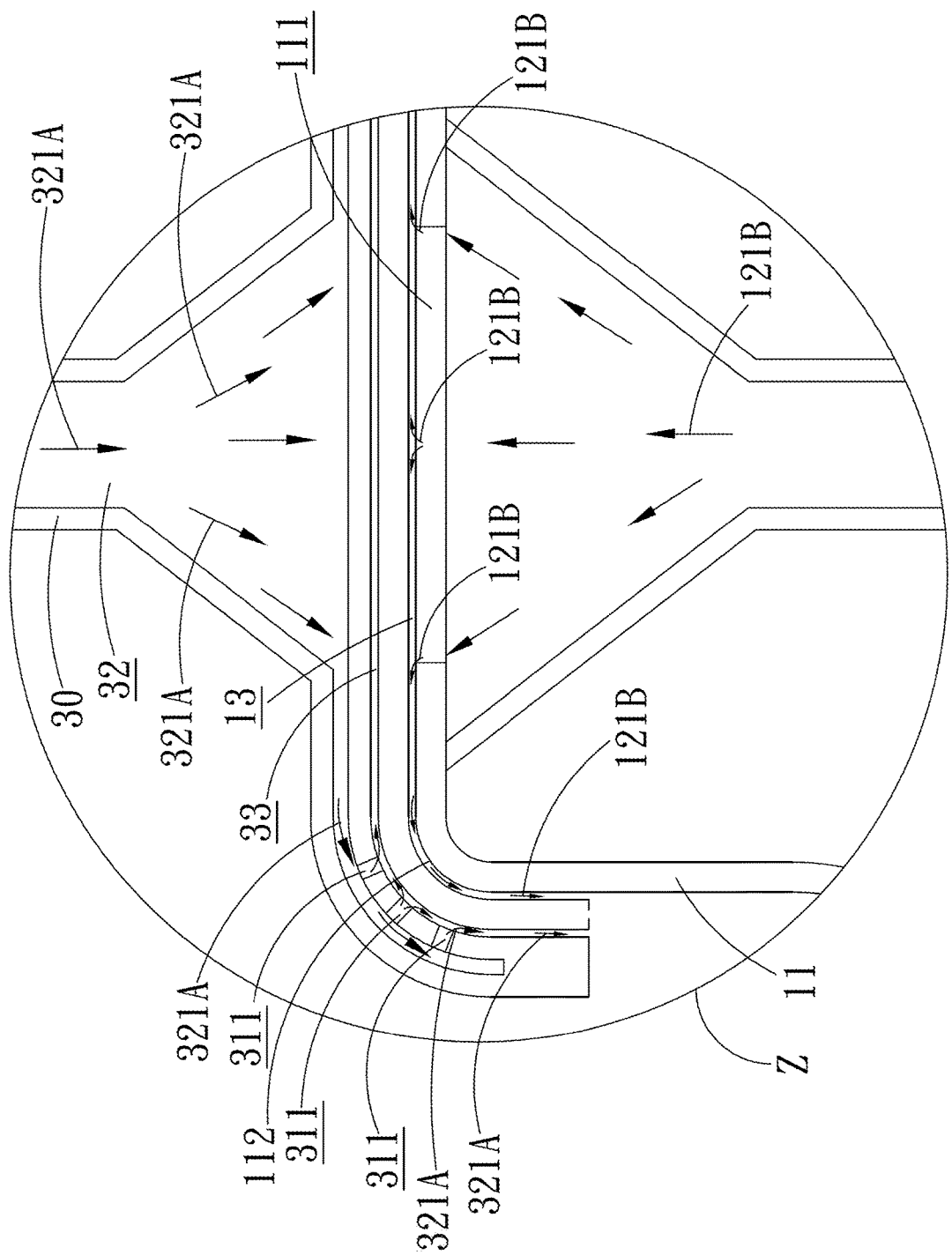
FIG. 8 is an enlarged view of a portion marked "Z" in FIG. 7.
Figure 10:
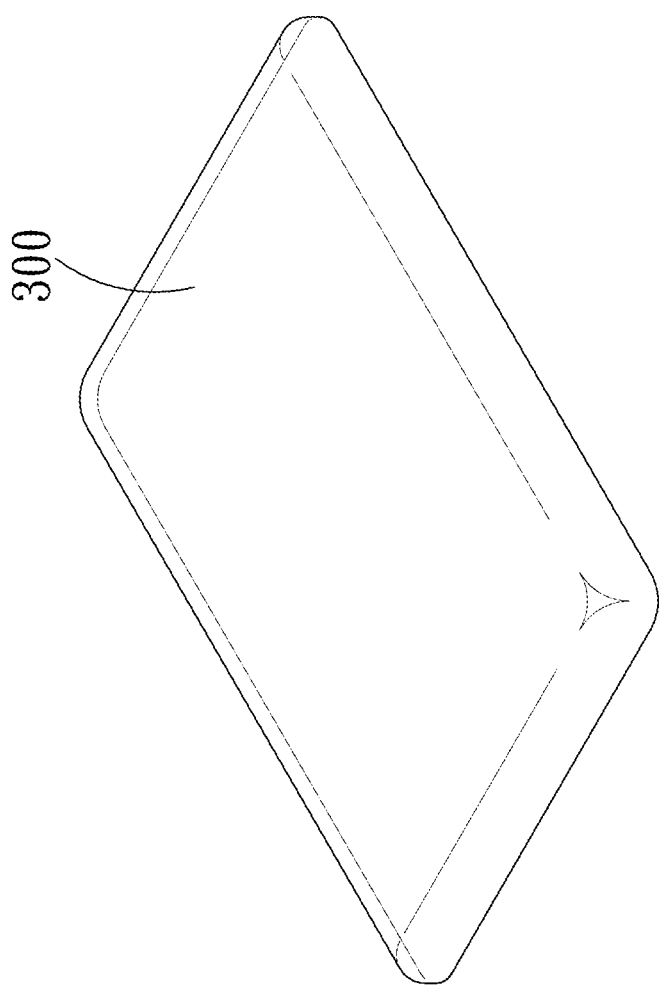
FIG. 10 is a schematic view illustrating the three-dimensional curve-surfaced glass product that is formed with the non-contact shaping device of the present invention.

Referring further to FIGS. 7 and 8, the second fixture 30 is shown completely covering and housing a top side of the curved glass plate 200' that has been heated and a blowing-out gas 121B is supplied through the egress gas hole 111 of the fixing section 11 of the first fixture 10 to cause the heated curved glass plate 200' to lift upward so that a first gas gap 13 is formed between the fixing section 11 that is on the top of the first fixture 10 and the shaping curve surface 112 formed on the four edges of the front, rear, left, and right sides of the perimeter of the fixing section 11 and an under surface of the curved glass plate 200', whereby the blowing-out gas 121B (as indicated by arrows shown in FIG. 8) flows through the first gas gap 13 and surrounds the undersurface of the curved glass plate 200, and similarly, a second gas gap 33 is formed between the shaping recess 31 formed on the undersurface of the second fixture 30 and an undersurface of the curved glass plate 200, whereby the blowing-out gas 321A (as indicated by arrows shown in FIG. 8) that flows through the egress gas hole 311 in the circumferential wall of the shaping recess 31 on the undersurface of the second fixture 30 may similarly flows through the second gas gap 33 and surrounds the top surface of the curved glass plate 200' to set he curved glass plate 200' in a stable and balanced condition between the first gas gap 13 and the second gas gap 33, wherein the blowing-out gas 121B that is supplied upward from the first fixture 10 and the blowing-out gas 321A that supplied downward from the second fixture 30 provide support to the top surface and the undersurface of the curved glass plate 200' and the heated and thus curved predetermined heating portions 210, to allow the first fixture 10 and the second fixture 30 to carry out an operation of temperature reduction or cooling of the curved glass plate 200' for fixing the shape thereof to form a three-dimensional curve-surfaced glass product 300 (as shown in FIG. 10).

The first gas gap 13 and the second gas gap 33 may each have a height of 5-50 micrometers. The blowing-out gas 121B supplied upward from the first fixture 10 to the first gas gap 13 and the blowing-out gas 321A supplied downward from the second fixture 30 to the second gas gap 33 may be of the same pressure, but the blowing-out gas 121B has a temperature higher than a temperature of the blowing-out gas 321A to allow a temperature of an inner portion of the heated and curved predetermined heating portions 210 of the curved glass plate 200' to be relatively high, while a temperature of an outer portion thereof is relatively low to facilitate smooth downward curving of the predetermined heating portions 210.

Figure 9:
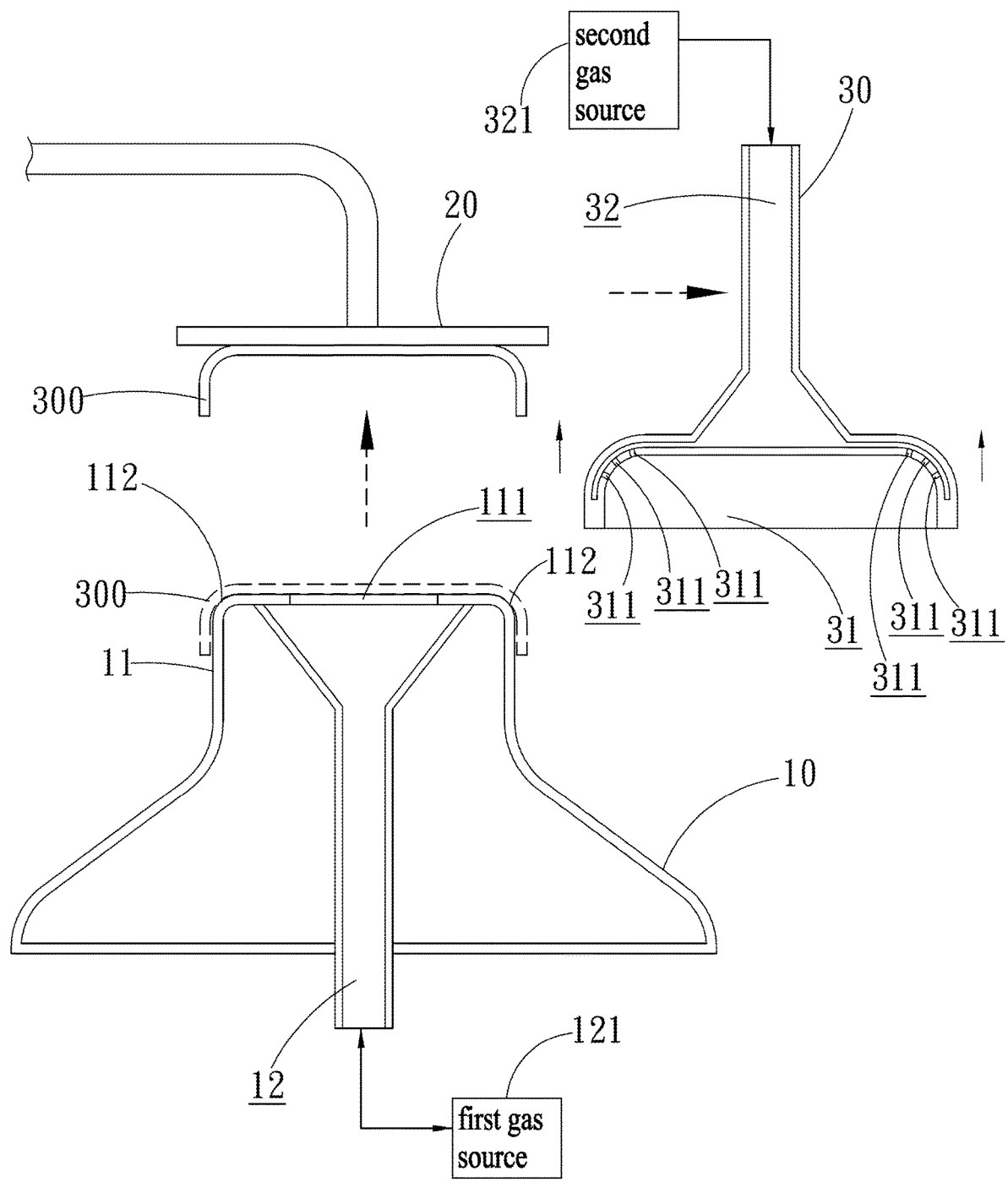
FIG. 9 is a side elevational view illustrating a condition that the non-contact shaping device of the present invention removes the cooled and shape-fixed three-dimensional glass product from the fixing section of the first fixture.

Referring to FIGS. 9 and 10, after the curved glass plate 200' as shown in FIGS. 7 and 8 is subjected to collaborative cooling, in a non-contact manner as being kept between the first gas gap 13 and the second gas gap 33, with the blowing-out gas 121B supplied upward from the first fixture 10 to the first gas gap 13 and the blowing-out gas 321A supplied downward from the second fixture 30 to the second gas gap 33, to get cooled and shape fixed to form the three-dimensional curve-surfaced glass product 300, the first gas source 121 of the first fixture 10 shuts down the supply of the blowing-out gas 121B, and starts to generate the sucking-in gas 121A, so that the three-dimensional curve-surfaced glass product 300 that has been cooled and shape fixed in a non-contact manner is caused to have the undersurface thereof attached, through suction, to the fixing section 11, and then, the second gas source 321 of the second fixture 30 shuts down the supply and downward-blowing of the blowing-out gas 321A, and the second fixture 30 is moved away from the top surface of the cooled and shape-fixed three-dimensional curve-surfaced glass product 300 (as indicated by phantom arrows of FIG. 9), and then, the first gas source 12 of the first fixture 10 shuts down the supply and blowing of the sucking-in gas 121A, and the movable pick-up device 10A moves to a location above the first fixture 10 to pick up, from below, the three-dimensional curve-surfaced glass product 300 located on the fixing section 11 on the top of the first fixture 10.

The way of picking up or removing the three-dimensional curve-surfaced glass product 300 according to the present invention is not limited to what described herein and may alternatively be such that the second fixture 30 is pulled upward and moved away while the first fixture 10 keeps on supplying the blowing-out gas 121B to keep the three-dimensional curve-surfaced glass product 300 in an upward-lifted condition to allow the movable pick-up device 10A to pick up, from below, the three-dimensional curve-surfaced glass product 300.

Figure 11:
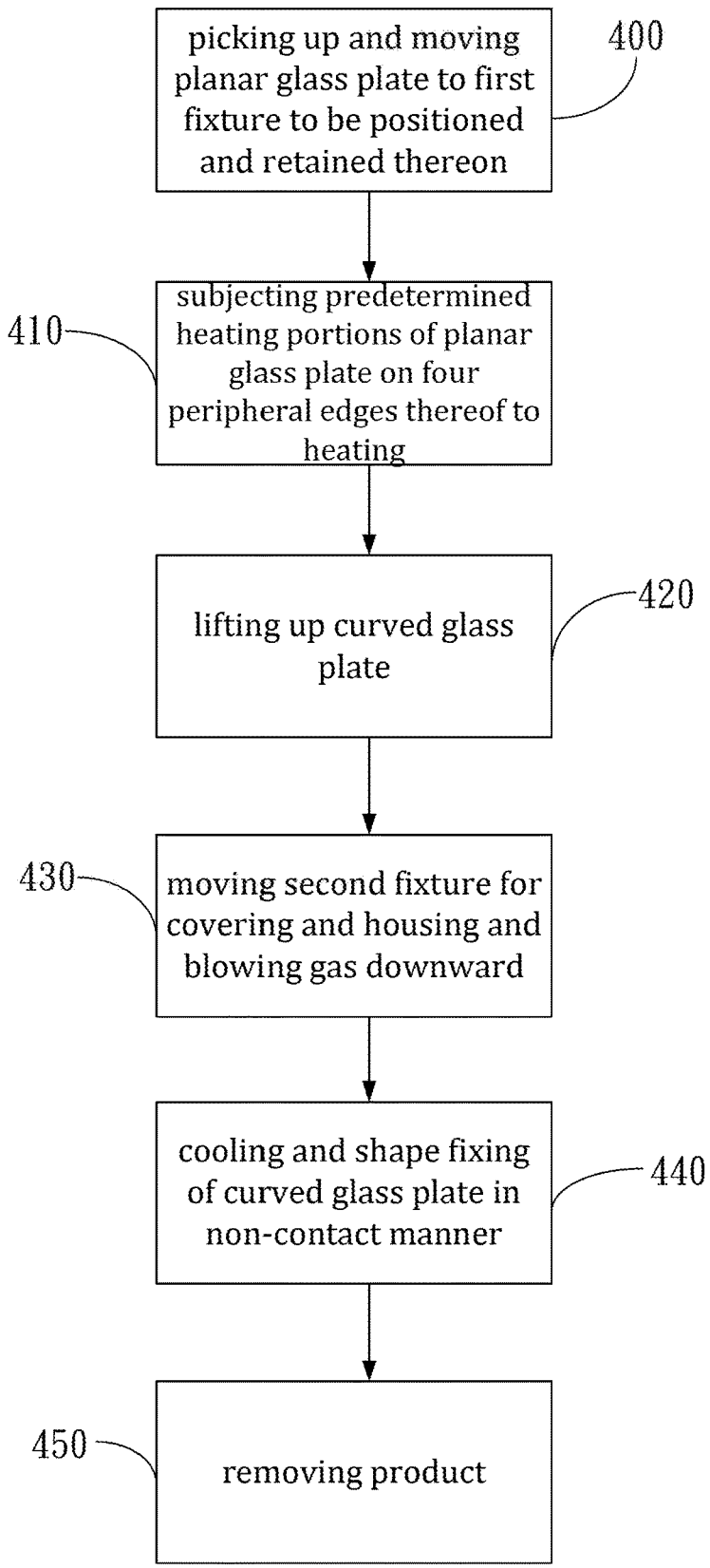
FIG. 11 is a flow chart illustrating a non-contact shaping method according to the present invention.

Referring to FIG. 11, a non-contact shaping method according to the present invention comprises the following steps, including Step 400-450, wherein:

(400) picking up and moving planar glass plate to first fixture to be positioned and retained thereon, wherein a planar glass plate 200 is picked up with a movable pick-up device 10A and is moved to and positioned on a fixing section 11 on a top of a first fixture 10, and the fixing section 11 of the first fixture 10 supplies a sucking-in gas 121A to have the planar glass plate 200 attached, through suction, to and thus positioned on the fixing section 11;

(410) subjecting predetermined heating portions of planar glass plate on four peripheral edges thereof to heating, wherein a movable and temperature-controllable optic heat source processing device 20 is moved to a located above the fixing section 11 of the first fixture 10 of Step (400) and carries out a heating operation, in a non-contact manner with light based heating, on the predetermined heating portions 210 of the four peripheral edges of front, rear, left, and right sides of the planar glass plate 200 that is positioned on the fixing section 11 of the first fixture 10 such that the planar glass plate 200 is gradually heated to a temperature that is lower than the glass softening point temperature by around 30-80° C., and then, the predetermined heating portions 210 that are to be curved are heated to the softening temperature of around 500-800° C. to have the four peripheral edge portions of the planar glass plate softened and thus curved and suspending downward along the periphery of the fixing section;

(420) lifting up curved glass plate, wherein the fixing section 11 of the first fixture 10 of Step (400) supplies a blowing-out gas 121B to force the curved glass plate 200' that is retained on the fixing section 11 of the first fixture 10 and is subjected to heating by the optic heat source processing device 20 in Step (410) to lift upward and thus separate from the fixing section 11, such that the heated curved glass plate 200' and the fixing section 11 of the first fixture 10 form therebetween a first gas gap 13 to allow the blowing-out gas 121B supplied from the fixing section 11 of the first fixture 10 to flow through the first gas gap 13 and get around an undersurface of the heated curved glass plate 200';

(430) moving second fixture for covering and housing and blowing gas downward, wherein a movable and gas-blowing second fixture 30 is moved to set on and cover and house a top side of the curved glass plate 200' that is caused to lift upward by the blowing-out gas 121B supplied upward from the fixing section 11 of the first fixture 10 in Step (420) so that an undersurface of the second fixture 20 and a top surface of the curved glass plate 200' form therebetween a second gas gap 33, and the second fixture 30 blows downward, from the undersurface thereof, a blowing-out gas 321A that moves through the second gas gap 33 to flow around a top surface of the curved glass plate 200';

(440) cooling and shape fixing of curved glass plate in non-contact manner, wherein with the blowing-out gas 121B that is supplied and blown upward from the fixing section 11 of the first fixture 10 in Step (420) and moves through the first gas gap 13 formed between the curved glass plate 200' that is heated in Step (410) and the fixing section 11 of the first fixture 10 to flow around an undersurface of the curved glass plate 200' and the blowing-out gas 321A that is supplied and blown downward from the second fixture 30 in Step (430) and moves through the second gas gap 33 between the undersurface of the second fixture 30 and the top surface of the curved glass plate 200' to flow around the top surface of the curved glass plate 200, the curved glass plate 200' is kept between the first gas gap 13 and the second gas gap 33 and is subjected to collaborative cooling by the blowing-out gas 121B supplied and blown upward by the first fixture 10 and the blowing-out gas 321A supplied and blown downward by the second fixture 30, in a manner of not contacting the first fixture 10 and the second fixture 30, and thus shape fixed to form a three-dimensional curve-surfaced glass product 300; and (450) removing product, wherein the fixing section 11 of the first fixture 10 of Step (440) supplies, in an opposite direction, a sucking-in gas 121A to have an undersurface of the three-dimensional curve-surfaced glass product 300 that is cooled and shape fixed in a non-contact manner, in Step (440) fixed through suction and then the second fixture 30 of Step (440) shuts down the supply and downward blowing of the blowing-out gas 321A from the underside thereof and the second fixture 30 is moved away from the top of the cooled and shaped three-dimensional curve-surfaced glass product 300 of Step (440), and then, the fixing section 11 of the first fixture 10 shuts down the supply of the sucking-in gas 121A, and the movable pick-up device 10A of Step (400) is moved to a location above the first fixture 10 to pick up, from below, the three-dimensional curve-surfaced glass product 300 positioned on the fixing section 11 on the top of the first fixture 10.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A non-contact shaping device, comprising:
at least one first fixture operable to supply a blowing-out gas and a sucking-in gas and having a top on which a fixing section is formed, the fixing section on the top of the first fixture being structure to allow the blowing-out gas and the sucking-in gas to be supplied therethrough to carry out an operation of suction-fixing or an operation of lifting upward for at least one planar glass plate;
at least one movable and temperature-controllable optic heat source processing device, wherein the optic heat source processing device is movable to a location above the first fixture to carry out heating, in a non-contact and temperature controlled manner, on predetermined heating portions on four peripheral edges of front, rear, left, and right sides of the planar glass plate positioned on the fixing section of the first fixture so that the predetermined heating portions of the four peripheral edges of front, rear, left, and right sides of the planar glass plate are softened and thus curved and suspending downward along a periphery of the fixing section and the curved glass plate is then caused to lift upward by gas blown from the fixing section of the first fixture; and
at least one movable and downward-gas-blowing second fixture, wherein the second fixture is movable to cover and house a top side of the curved glass plate that is caused to lift upward by gas blowing from the first fixture and wherein the second fixture supplies a blowing-out gas downward from an underside thereof to collaboratively surround, in combination with the blowing-out gas blown upward from the first fixture, a top surface and an undersurface of the curved glass plate to cause, in a non-contact manner, cooling and shape fixing of the curved glass plate to form a three-dimensional curve-surfaced glass product.

2. The non-contact shaping device according to claim 1, wherein the first fixture is formed therein with at least one gas blowing and sucking channel, and the fixing section of the first fixture is formed with at least one egress gas hole, the egress gas hole being connected to and in communication with an end of the gas blowing and sucking channel.

3. The non-contact shaping device according to claim 2, wherein an end of the gas blowing and sucking channel of the first fixture is connected to at least one first gas source.

4. The non-contact shaping device according to claim 3, wherein the first gas source connected to an end of the gas blowing and sucking channel of the first fixture is operable to supply a sucking-in gas or a blowing-out gas of which a temperature is controllable.

5. The non-contact shaping device according to claim 1, wherein the first fixture and the second fixture are each made of a temperature-resistant metallic material.

6. The non-contact shaping device according to claim 1, wherein the first fixture and the second fixture are each made of a temperature-resistant non-metallic material.

7. The non-contact shaping device according to claim 1, wherein a shaping curve surface is formed in each of four peripheral edges of front, rear, left, and right sides of the fixing section of the first fixture.

8. The non-contact shaping device according to claim 1, wherein the fixing section of the first fixture and an undersurface of the heated and upward-lifted curved glass plate form therebetween a first gas gap, so that the blowing-out gas of the fixing section is allowed to move through the first gas gap to flow around the undersurface of the curved glass plate.

9. The non-contact shaping device according to claim 1, wherein the first gas gap formed between the fixing section of the first fixture and the inner surface of the heated and upward-lifted curved glass plate has a height of 5-50 μm.

10. The non-contact shaping device according to claim 1, wherein the planar glass plate that is positioned on the fixing section of the first fixture is picked up and moved to the location on the fixing section by at least one movable pick-up device.

11. The non-contact shaping device according to claim 1, wherein the planar glass plate positioned on the fixing section of the first fixture is subjected to homogeneous pre-heating on a surface thereof to a temperature that is lower than a glass transition temperature of a glass material of the planar glass plate by around 30-80° C.

12. The non-contact shaping device according to claim 1, wherein the optic heat source processing device comprises an infrared heater.

13. The non-contact shaping device according to claim 1, wherein the optic heat source processing device comprises a laser heater.

14. The non-contact shaping device according to claim 1, wherein the second fixture is formed, in an undersurface thereof, with at least one egress gas hole, and the second fixture is formed, in an interior thereof, with at least one gas blowing channel, the egress gas hole being connected to and in communication with an end of the gas blowing channel.

15. The non-contact shaping device according to claim 14, wherein the gas blowing channel of the second fixture has an end connected to at least one second gas source.

16. The non-contact shaping device according to claim 15, wherein the second gas source connected to an end of the gas blowing channel of the second fixture is operable to supply a temperature controllable blowing-out gas.

17. The non-contact shaping device according to claim 1, wherein the second fixture has an undersurface that is formed with a shaping recess, such that when the second fixture is moved to cover and house the top side of the curved glass plate that is caused to lift upward by gas blowing from the first fixture, the shaping recess and a top surface of the heated curved glass plate form a second gas gap therebetween to allow a gas blown downward from the undersurface of the second fixture to move through the second gas gap to flow around a top surface of the curved glass plate.

18. The non-contact shaping device according to claim 17, wherein the second gas gap formed between the shaping recess of the second fixture and the top surface of the heated curved glass plate has a height of 5-50 micrometers.

19. The non-contact shaping device according to claim 1, wherein the blowing-out gas supplied from the fixing section of the first fixture has a temperature that is higher than a temperature of the blowing-out gas supplied from the under-surface of the second fixture.

* * * * *